Sept. 28, 1954      T. A. PERLS      2,690,469

FLEXIBLE, LOW-NOISE, ELECTRICAL CABLE

Filed Jan. 5, 1952      2 Sheets-Sheet 1

INVENTOR.
Thomas A. Perls.

Sept. 28, 1954          T. A. PERLS          2,690,469

FLEXIBLE, LOW-NOISE, ELECTRICAL CABLE

Filed Jan. 5, 1952          2 Sheets-Sheet 2

INVENTOR.
Thomas A. Perls.

Patented Sept. 28, 1954

2,690,469

UNITED STATES PATENT OFFICE 2,690,469

FLEXIBLE, LOW-NOISE, ELECTRICAL CABLE

Thomas A. Perls, Glen Echo, Md., assignor to the United States of America as represented by the Secretary of Commerce Application January 5, 1952, Serial No. 265,190

6 Claims. (Cl. 174—106)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to the development of a flexible cable which will be free of spurious electrical signals when subjected to shock and vibration.

In many instrumentation problems, spurious signals are generated by cables exposed to shock and vibration. This noise (i. e., spurious electrical signals) has limited the use of crystal type microphones, phonograph pickups, and many other high-impedance devices in the fields of measurement, control, detection, and communication. The mechanism of noise generation has not been well understood in the past and has been assumed to be somehow related to piezoelectric and converse electrostrictive effects, changes in the electrical constants of the cable, the generation of small potentials in the dielectric itself due to intercolecular friction, or the generation of frictional charges at the outer surface of the dielectric where it is in contact with the outer conductor.

To date little has been accomplished in this field toward reducing these noise voltages. However, numerous high-voltage cables have been developed that exhibit many features which are similar to those of the present invention. Some of these cables, of which those covered by Patents No. 2,377,153 and No. 2,304,210 are representative, have an inner conductor, a layer of conductive material, a layer of a dielectric, another layer of conductive material, and an outer conductor in the form of an armored sheath. In these cables the outer armored conductor must be bonded tightly to the second layer of conductive material. In some the inner conductive material is bonded tightly to the inner conductors, while in others the spaces between the inner conductive material and the inner conductor is preferably filled with an inert gas or other material that will exclude air.

The functioning of these devices depends on providing a nearly uniform voltage gradient from the conductor to the dielectric, and it is therefore desirable for high-voltage cables to have the conductive coating in intimate contact with both the conductor and the dielectric; it is for this reason that high-voltage cable is bonded as intimately as possible or is provided with conductive material to provide good conduction between the conductor and the conductive coating.

The requirements for these cables make them large and bulky and very rigid. R. M. Pierce and V. Seigfreid in their article "Noise suppression in coaxial cable" in the Annual Report of the Conference on Electrical Insulation, 1948 (National Research Council) make the following statement: "Experience with the successful reduction of ionization in high-voltage power cable by the use of a semiconducting material of physical characteristics similar to the dielectric, and *serving as a bond between the dielectric and electrodes,* suggested the use of the *same construction* for noise-free microphone cable." (Italics mine.) It will be noted that it is considered necessary that the semiconducting (more properly "conductive") layers serve as a bond between the dielectric and the conductors thereby producing a rigid construction. The suggestion that this "same construction" be used for microphone cable implies that this same rigidity is required for a successful noise-free cable. That those skilled in the art believe rigidity to be an essential feature of noise-free cables is further demonstrated by the fact that the only cables now available, in which an attempt has been made to reduce the noise level, incorporate this rigid construction. The bulk and inflexibility of these cables has greatly restricted their use, particularly in conjunction with microphones and with detection and communication units.

It is therefore the primary object of this invention to provide a highly flexible, low-noise cable.

Another object of this invention is to provide for the reduction of noise levels in cables without decreasing the flexibility or increasing the size of the cable.

Another object of this invention is to provide for the prevention of spurious electrical signals in flexible cables without requiring the bonding of the conductive material to the conductors.

Another object of this invention is to provide a flexible cable which, at an associated total capacitance of approximately 100 micro-microfarads, has a noise voltage level of below 200 micro-volts.

Another object of this invention is to provide a simple means for reducing the noise in flexible cables.

In accordance with the present invention the inside and outside surfaces of the dielectric surrounding the central conductor of a coaxial cable, or the several conductors of a multiconductor cable, are entirely covered by a integrally bonded conductive coating. This is the only requirement necessary for the reduction of these noise levels in the coaxial cable, and it has no effect upon the flexibility of the cable, as it is unnecessary to attempt to make the conducting layers adhere to the conductors, and air spaces between the conductors and conductive coatings are intentionally included. When making a noise-free multi-conductor cable it is also necessary either to coat the inside of a dielectric which encloses all of the cores of the cable or to enclose all of the cores within a flexible shield before enclosing the cable in the outer dielectric covering. With this type of cable the noise levels have been reduced by a factor of 200 to 500 over the noise levels of standard commercial cables of the same associated capacitance and by a factor of 100 over the noise levels of the best nonflexible cables of the same associated capacitance. In cables made according to the present invention the voltage levels of the noise signals have been kept under 200 microvolts.

Other advantages of the invention will become apparent upon reference to the specifications and drawings.

The theory of the mechanism behind the generation of spurious signals due to shock and vibration will be explained with reference to Figure 1.

Figure 1:
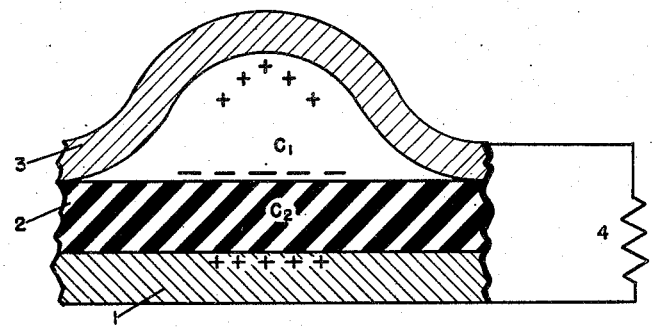
Figure 1 is a representation of a longitudinal cross section of a coaxial conductor.

In Figure 1 there is shown a central conductor 1 of a coaxial cable, a dielectric 2 around this conductor, and an outer conducting shield 3. The cable is connected to the load 4.

Whenever the metal makes intermittent contact with the dielectric, a separation of electric charge takes place in the same manner as in the elementary physics demonstration in which two different dielectrics are rubbed together. Friction is not necessary for this effect. It increases the density of the separated electrical charge only because it insures better mechanical contact before separation. With reference to Figure 1, the effects of this separation will be explained first by having only one of the conductors 3 free to move, while the other conductor is rigidly bonded to the dielectric. As a small area of the shield separates from the dielectric, a surface charge is left on the dielectric and an opposite "bound" charge appears on the shield, forming condenser $C_1$. As the air gap increases, the charge on conductor 3 becomes increasingly "free," and a portion of this charge is redistributed, so that it ultimately appears on the central conductor 1 of the cable at a point opposite the separated charge on the dielectric. This redistribution of charge requires a flow of current through the terminal impedance 4 of the cable, which, in turn, develops the "noise" voltage. A second condenser $C_2$ is also present in this system. This condenser is formed by the inner conductor 1, the dielectric 2 and the upper surface of the dielectric. This condenser becomes charged when the redistributed charge from the outer conductor appears on the inner conductor at a point opposite the charge trapped on the upper surface of the dielectric. It is seen that this process can also take place when the inner conductor is, or both conductors are, free to separate from the dielectric.

The signals that may be generated in this manner are limited by the density of surface charge allowed by the breakdown voltage of the dielectric (usually air) between the cable dielectric and the separated conductor. The "noise" voltage generated by the maximum allowed surface charge may be calculated from the electrical constants of the system, and it is in good agreement with experimental data on several cables.

The equation for the spurious noise voltages is $$V = \frac{\sigma A}{C_3} \cdot \frac{C_2}{C_1 + C_2} \epsilon^{-(1/RC_3)t}$$

in which $\sigma$ is the magnitude of the charge separated per unit area.

A is the area of the dielectric separated from the conductor.

$C_1$ is the capacitance of the air capacitor formed by the surfaces of the dielectric and the moving conductor.

$C_2$ is the capacitance of the capacitor formed by the upper surface of the dielectric over the separated area and the stationary conductor.

$C_3$ is the total cable capacitance including any parallel capacitance.

R is the input impedance 4 of the terminal device.

This equation immediately indicates two things. The first is that the initial amplitude of the spurious noise signals is independent of the magnitude of the terminal impedance. However, these noise signals will not give trouble in low-frequency devices if the input impedance is low. The reason for this is that if the $RC_3$ constant is small, then the effective frequency of the signal is high and low-frequency devices will not detect the noise. With a high terminal impedance, the effective frequency of the spurious noise will be relatively low and the amplifying or recording device will detect the noise.

The second condition indicated by the equation is that if $C_1$ becomes infinite the value of the spurious voltage becomes zero. This is readily done by maintaining good electrical conduction between all points on the surfaces of the dielectric and the adjacent conductor. Under these conditions it is not necessary to prevent relative motion between, or separation of, the dielectric 2 and either of the conductors 1 and 3 in order to prevent the generation of noise signals. Therefore the only requirement which must be met by a cable to be free of objectionable spurious signals due to shock and vibration is that the inside and outside surfaces of the insulation surrounding the inner conductor be entirely covered by a integrally bonded conductive coating. By integrally bonded it is meant that the bond between the conductive coatings and the dielectric is sufficiently good that under the most severe conditions to which the cable is to be exposed there shall be absolutely no separation between the conductive coatings and the dielectric. It is not necessary that the resistance of this coating be very low. It has been found experimentally that the resistance of this coating may be of any value up to approximately 50 megohms per linear inch of cable and still reduce the cable noise by a factor of 200 as compared with the value obtained with the same cable without the conductive coatings. The above analysis is obviously not restricted to a coaxial cable but is applicable to a multiconductor cable as well.

Figure 2:
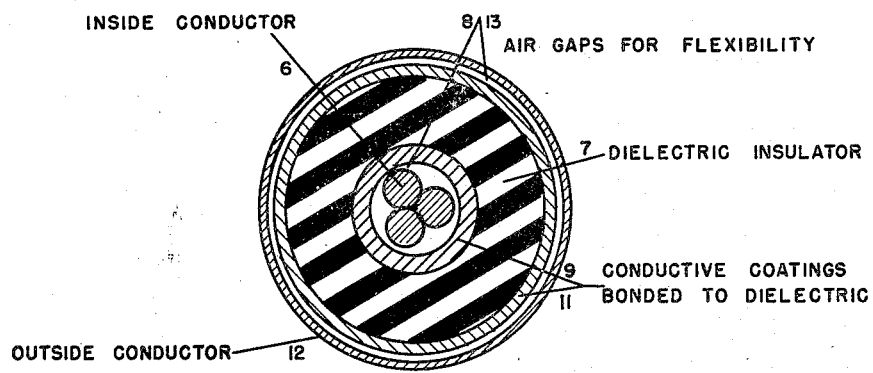
Figure 2 shows a transverse cross section of a coaxial cable made in accordance with the present invention.

Figure 2 is a drawing showing a cross-sectional area of a flexible coaxial cable produced in accordance with the present invention. A stranded inner conductor 6 (a stranded conductor being used to obtain greater flexibility) is surrounded by a loose-fitting dielectric 7 which leaves an air gap 8 between the inner conductor and the dielectric. The dielectric is coated on the inside and outside with conductive coatings 9 and 11. The outer conductive shield 12 fits loosely around the dielectric leaving an air gap 13. The air gaps are shown in the drawing as being uniform about the conductor 6 and the conductive coating 11. However, no provision is made for holding the parts 6 and 11 in the center of the air gaps and in practice the conductor 6 will more than likely lie on the bottom of the conductive coating 9 and the entire inner structure composed of parts 6, 7, 9, and 11 will probably lie on the bottom of the outer conductor 12. At any given instant, however, the relative positions of these units with respect to each other will depend upon the vibration or shock to which the cable has been subjected. The only parts which are definitely fixed in relation to each other are the conductive coatings 9 and 11 and the dielectric 7.

Figure 3:
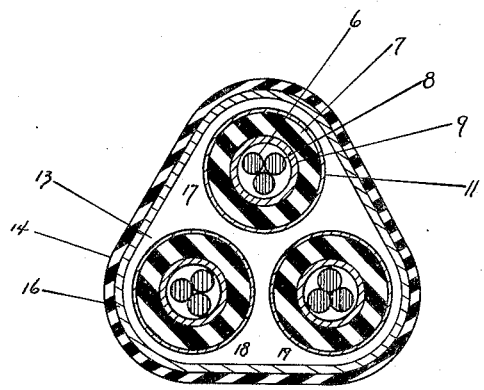
Figure 3 shows a transverse cross section of an unshielded multiconductor cable made in accordance with the present invention.

Figure 3 shows an unshielded multiconductor cable produced in accordance with the present invention. The stranded conductors 6 are surrounded by loose-fitting dielectrics 7, leaving air gaps 8 between the conductors 6 and the inner conductive coatings 9 which are bonded to the inner surfaces of the dielectrics 7. The outer surfaces of the dielectrics are coated with the conductive coatings 11, which are also bonded to the dielectrics. The cores 17, 18, and 19, each core being made up of the parts 6, 7, 9, and 11, are enclosed in a loose-fitting outer dielectric 14, leaving an air gap 13. The inner surface of the dielectric 14 is covered with a conductive coating 16 which is bonded tightly to the dielectric.

Figure 4:
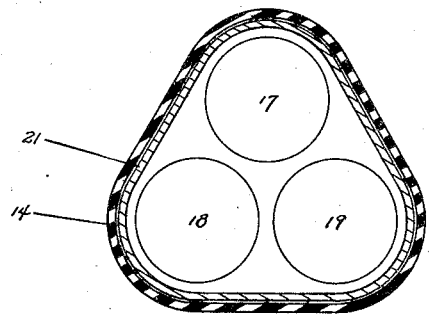
Figure 4 shows a transverse cross section of a shielded multiconductor cable made in accordance with the present invention.

If the cable is to be shielded, the structure shown in Figure 4 is used. The cores 17, 18 and 19 (which are shown merely as circles) are enclosed in a flexible metallic shield 21 that fits loosely around the cores. The entire cable may then be enclosed inside of the loose-fitting dielectric 14. In this case the dielectric 14 does not require a conductive coating.

A number of coating mediums are available for use in the production of this cable. These take the form of solutions, suspensions, and pastes, and they may be sprayed or brushed on. Also the method of extruding successive layers of conductive and nonconductive rubber may be used. However, these methods are well known in the prior art and form no part of the present invention.

It will be apparent that the embodiments shown are only exemplary and that various modifications can be made in construction and arrangement within the scope of my invention as defined in the appended claims.

I claim:

1. A flexible, low-noise, coaxial cable comprising a stranded inner conductor, a dielectric surrounding said inner conductor, a flexible outer conductor surrounding said dielectric, conductive coatings integrally bonded to the inner and outer surfaces of said dielectric, the inner conductive coating fitting loosely around the inner conductor and the outer conductor fitting loosely around the outer conductive coating, thereby allowing the conductors to move freely with respect to the conductive coatings and insuring flexibility.

2. The invention according to claim 1 in which the resistance of the conductive coatings is less than 50 megohms per linear inch of coating.

3. A flexible, low-noise cable comprising several cores, each core comprising a flexible conductor, a dielectric surrounding said conductor, conductive coatings integrally bonded to the inner and outer surfaces of said dielectric, the inner conductive coating fitting loosely about the inner conductor thereby allowing the inner conductor to move freely with respect to the conductive coating, a dielectric enclosing all of said cores, and a conductive coating bonded to the inner surface of said last-mentioned dielectric, said last-mentioned dielectric fitting loosely about said cores.

4. A flexible, low-noise cable comprising several cores, each core comprising a flexible conductor, a dielectric surrounding said conductor, conductive coatings integrally bonded to the inner and outer surfaces of said dielectric, the inner conductive coating fitting loosely about the inner conductor thereby allowing the inner conductor to move freely with respect to the conductive coating, a flexible metallic shield enclosing all of said cores and a dielectric enclosing said shield, said shield fitting loosely about said cores and said last-mentioned dielectric fitting loosely about said shield.

5. A flexible low-noise cable, comprising at least one inner conductor, at least one dielectric around each said inner conductor, a shield around the outside of said cable, and conductive coatings integrally bonded to the inner and outer surfaces of each of said dielectrics inside of said shield, conductive surfaces which are in electrical contact being freely movable with respect to each other.

6. A flexible, low-noise, cable comprising a flexible inner conductor, a dielectric surrounding said inner conductor, a flexible outer conductor surrounding said dielectric, conductive coatings bonded to the inner and outer surfaces of said dielectric, the inner conductive coating fitting loosely around the inner conductor and the outer conductor fitting loosely around the outer conductive coating, thereby allowing the conductors to move freely with respect to the conductive coatings and insuring flexibility.

References Cited in the file of this patent

UNITED STATES PATENTS

| Number | Name | Date |
|---|---|---|
| 2,165,738 | Van Hoffen | July 11, 1939 |
| 2,377,153 | Hunter et al. | May 29, 1945 |
| 2,434,793 | Feaster | Jan. 20, 1948 |

FOREIGN PATENTS

| Number | Country | Date |
|---|---|---|
| 607,651 | Great Britain | Sept. 2, 1948 |